United States Patent
Kamlani (10) Patent No.: US 9,357,404 B2
(45) Date of Patent: May 31, 2016

(54) INTERFERENCE CONTROL IN WIRELESS COMMUNICATION

(71) Applicant: OpenTV, Inc., San Francisco, CA (US)

(72) Inventor: Ari Ranjit Kamlani, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 279 days.

(21) Appl. No.: 13/887,039

(22) Filed: May 3, 2013

(65) Prior Publication Data

US 2014/0328257 A1 Nov. 6, 2014

(51) Int. Cl.
*H04W 4/00* (2009.01)
*H04W 24/02* (2009.01)

(52) U.S. Cl.
CPC ..................... *H04W 24/02* (2013.01)

(58) Field of Classification Search
None
See application file for complete search history.

(56) References Cited

U.S. PATENT DOCUMENTS

| 7,773,995 | B2 * | 8/2010 | Rappaport et al. | 455/446 |
| 8,666,391 | B2 * | 3/2014 | Duan | 455/424 |
| 2009/0093252 | A1 * | 4/2009 | Czaja et al. | 455/436 |
| 2012/0003976 | A1 * | 1/2012 | Bhat et al. | 455/436 |
| 2012/0281563 | A1 * | 11/2012 | Comsa et al. | 370/252 |
| 2013/0094374 | A1 * | 4/2013 | Zhou et al. | 370/252 |
| 2013/0128793 | A1 * | 5/2013 | Bahl et al. | 370/311 |
| 2013/0288640 | A1 * | 10/2013 | Bonner | 455/406 |
| 2014/0244063 | A1 * | 8/2014 | Davis et al. | 700/297 |
| 2014/0269610 | A1 * | 9/2014 | Hiben et al. | 370/331 |
| 2014/0307551 | A1 * | 10/2014 | Forssell | 370/235 |

\* cited by examiner

*Primary Examiner* — Phirin Sam
(74) *Attorney, Agent, or Firm* — DLA Piper LLP US (57) ABSTRACT

Wireless communication techniques for controlling radio frequency (RF) interference among a plurality of wireless devices operating at a location include monitoring RF utilization at the location, receiving a request from a wireless device indicating that the wireless device wishes to operate using an RF interference control service and communicating, in response to the received request from the wireless device, a software module that provides access point functionality to the wireless device.

10 Claims, 8 Drawing Sheets

INTERFERENCE CONTROL IN WIRELESS COMMUNICATION

TECHNICAL FIELD

This patent document relates to wireless communications.

BACKGROUND

Many user devices such as smartphones, tablets, laptops, televisions, game consoles, and so on, are equipped with wireless communication capabilities to wirelessly connect to the Internet or other communication networks. The 802.11 suite of air interface standards (collectively called Wi-Fi) is the most common technology used for wireless connectivity and offers useful connectivity over distances of up to a few hundred feet. With the proliferation of Wi-Fi enabled user devices, the application layer bandwidth available per user device may be unsatisfactory for some use cases.

While wireless standards have made progress to address such limited bandwidth issues, publically available Wi-Fi infrastructures, e.g., the wireless access points or routers that connect the wireless network to the Internet have primarily chosen to use simplistic Wi-Fi technologies.

Improvements to wireless communication techniques are desirable.

SUMMARY

This patent document discloses techniques for controlling interference among user devices in a wireless communication network and can be implemented to provide efficient use of available wireless spectrum at a particular location for wireless communications. In some embodiments, an interference controlling device can be deployed to operate side-by-side existing network infrastructure in a wireless location used by many users such as a shared or public Wi-Fi hotspot. In some embodiments, the interference controlling device guides user devices to operate using a set of transmission/reception rules that ensure minimal interference among devices with varying operational capabilities and bandwidth requirements. In some embodiments, a software module may be downloaded to some user devices for providing the user devices additional functionality to operate to mitigate the interference and efficiently using the spectrum at the location.

In one aspect, a method for providing wireless connectivity to a user device is disclosed. The method includes monitoring radio frequency (RF) characteristics of a location, receiving a connectivity request from a user device at the location, obtaining wireless operation capabilities of the user device, and providing, in response to the connectivity request and based on the wireless operation capabilities of the user device and the monitored RF characteristics of the location, wireless operation rules to the user device.

In another aspect, an apparatus for controlling radio frequency (RF) interference among a plurality of wireless devices operating at a location is disclosed. The apparatus includes an interference monitoring module that monitors radio frequency utilization at the location, a device registration module that receives a request from a wireless device indicating that the wireless device wishes to operate using an RF interference control service offered by the wireless communication apparatus. The apparatus also includes a download module that communicates, in response to the received request from the wireless device, a software module that provides access point functionality to the wireless device. In some embodiments, at least a portion of the apparatus is implemented in hardware.

These and other aspects and their implementations are described in greater detail in the drawings, the description and the claims.

BRIEF DESCRIPTION OF DRAWINGS

Embodiments described herein are illustrated by way of example and not limitation in the figures of the accompanying drawings, in which.

DETAILED DESCRIPTION

There is an ever-growing demand for wirelessly accessing the Internet or other communication networks at locations shared by many wireless users such as public or enterprise Wi-Fi locations at airports, restaurants, malls, offices, university campuses, company premises and so on. Users served by a shared wireless Wi-Fi hotspot may use different devices with wireless communication capabilities to wirelessly connect to the Internet or a communication network. Examples of such user devices include smartphones, mp3 players, tablet computers, laptops, gaming devices and others. Increasingly, wireless users accessing the Internet or a communication network tend to download or upload large files such as video and audio files or streams and such wireless users increase the user demand of the wireless bandwidth and Quality of Service at wireless locations that may not be easily available at crowded locations.

The 802.11 suite of standards for wireless connectivity using the Industrial, Scientific and Medicinal (ISM) spectrum can provide wireless access to the Internet or a network through devices and services, generally referred to as a "hotspot." Over the past few years, several new techniques have been introduced to address the problem of crowding of wireless spectrum. For example, the 802.11h variant of the 802.11 wireless communication standard by Institute of Electrical and Electronics Engineers (IEEE) provides for dynamic frequency selection (DFS) and transmit power control (TPC) techniques to enable mitigation of inter-device interference and efficient utilization of wireless local area network (WLAN) spectrum. Another technique, called "Wi-Fi Direct" allows for establishment of a peer to peer wireless connection between wireless devices.

Various public, enterprise or other hotspots shared by many users, which provide free or paid wireless services, may be limited in some service aspects, e.g., their wireless throughput and their wireless service range. As the number of users desiring to wirelessly connect to the Internet or other networks goes up, such public, enterprise or shared hotspots face operational problems of not being able to meet the bandwidth and quality demand of the users.

A number of factors may contribute to the above operational problems. For example, some hotspots are deployed using pre-802.11h technologies, thereby not benefitting from the techniques described in these technologies for efficient wireless communication. For example, Wireless Access Point (WAP) routers operating in mixed-mode with slower speed client devices connected often cause higher speed client capable devices to suffer in throughput. This often happens with mixed 802.11 g and 802.11 n devices on the same wireless network. For example, the above operational problems may be in part caused by a lack of connection infrastructure management of some wireless hotspots on a pre-emptive basis with variant client devices connected to deliver optimal wireless throughput. For another example, different wireless devices in use today may be equipped to operate based on different technology standards and thus have different wireless connectivity performance levels caused by whether recent versions or legacy technology standards are used in such devices. For another example, many public and private hotspots have typical simplistic WAP(s) rather than the enterprise WAP(s) and this use of the simplistic WAP(s) limits the throughput and functionality of such hotspots because the simplistic WAPs may not implement bandwidth efficient techniques and some WAPs deployed today also may not have ability to operate in two different frequency bands. For another example, 802.11n and 802.11ac routers provide dual band operation at both the 2.4 GHz and 5 GHz bands and such dual band routers can reduce the reliance on the 2.4 GHz band which is overpopulated with user devices, especially older wireless devices which tend to be only 2.4 GHz capable and cannot operate in the 5 GHz range. Some newer devices may also be limited to a single frequency band (e.g., some recent tablet computers). Therefore, there may be issues with overloading a particular Wi-Fi frequency band in some hotspots. For another example, the distance from client devices to the router can affect the throughput as well as the capable wireless coverage. Wireless repeaters are often used to help boost the signal when placed within proper geometric areas, however they require additional infrastructure and overhead cost. For yet another example, Wi-Fi is inefficient at managing interference (unlicensed band), especially among differently connected environments, Wi-Fi and Non-Wi-Fi (microwaves, cordless phones, baby monitors, wireless video cameras, Bluetooth) devices. The WAP will perform its best to minimize interference for already connected devices, besides the contention at the media access control (MAC) PHY layer (e.g., collision avoidance).

The disclosed techniques can be used to address one or more of the above-discussed problems and other performance issues in wireless connectivity at wireless hotspots serving wireless users. Using some disclosed techniques, a service provider can be provide a wireless connectivity service for use in a public or other wireless access location serving wireless users. The service can be deployed "side by side" existing access point hardware and backend equipment in locations such as cafes, stores, airports, office buildings, and so on. Using disclosed techniques, the service provider may control and manage wireless operation of wireless devices to improve bandwidth availability and streamline bandwidth utilization. In some embodiments, the service can be embodied as a device that is reachable by user devices over a wireless interface or an Internet Protocol (IP) connection. In some embodiments, the service may download a software module to a user device to control the user device's operational frequency band, Quality of Service of wireless communication, whether the wireless device acts as a relay for providing wireless connectivity to another wireless device, and so on.

In some implementations, a pre-emptive connection process can be used to provide connectivity to a wireless device upon the device requesting to join a wireless network. In one advantageous aspect, enforcing interference-reducing techniques during the admission process alleviate the complexity of having to change operational parameters after wireless connectivity is established which could potentially disrupt application layer communication. As further discussed below, techniques that continuously monitor the RF environment at a location can be advantageously used to reduce interference among wireless devices. In some embodiments discussed below, training sequence initial input and a learned model of the environment may be used to continuously learn and adapt to RF environment. These and other useful techniques are further described below.

The channel interference and congestion problem is typically experienced in 802.11 variant networks rather than wireless 3G/4G operating carriers. Most 3G/4G carriers are charging for contracts based on amount of data usage, other than those consumers grandfathered into previous contracts. Therefore Wi-Fi based networks are stressed even more for these consumers. The use case can possibly be extended to multiple client stations (STA) using a limited MiFi network device.

In some embodiments as discussed below, locations that consist of legacy WAP routers (in contrast with enterprise class WAPs that have additional bandwidth management features and are more expensive dedicated function WAP routers) may especially benefit from the disclosed techniques.

Assuming that the backend (e.g., line-based connection to the Internet at a hotspot) is relatively fixed, improvements can be made to manage multiple client (STA) connections for optimal network throughput. This takes a more pre-emptive approach, rather than reactive approach done by the WAP. In addition, existing hardware and tools (e.g., a spectrum analyzer) can be used to monitor the RF spectrum to reduce interference. However, this is done by post-analyzing the statistics and environment. Instead, the present document discloses techniques such as an autonomous pre-emptive adaptation of the connection process and continuous monitoring of mixed STA environments to limit the overall interference. These techniques, in one advantageous aspect, can effectively mitigate interference as it arises or before it arises.

Other alternatives (internet connection sharing (ICS), Tethering, Wireless Mesh Networking (WMN)) do not attempt to manage the shared connection based on the different client environments; instead focusing on the underlying technology mechanism. Tethering based solutions have typically use Bluetooth Piconets and Legacy 802.11 ad-hoc networks. These technologies are not capable of providing the high bandwidth required by most application usages and have a limited address space (7 in case of Bluetooth). Other research alternatives (WiFox) have attempted to improve performance from the router component, rather than the STA, in order to flush queued data and prioritize some data over the other. Some enterprise router solutions even use smart antennas consisting of beam forming to direct the signal, rather than using typical omnidirectional antennas. However these routers are not typically found in most public sectors or even registered conferences and trade shows. The techniques disclosed in the present document provide, among other benefits, a legacy WAP router the ability to reduce environment interference without additional hardware and infrastructure.

Dual Band (2.4 GHz/5GHz) devices may have the ability to perform a similar function as a software access point (SoftAP). The SoftAP can be offered as a downloadable service without any required manual setup or PIN acknowledgement. In some embodiments, the downloadable service may allow each wireless station to additionally be operated in limited access point mode.

In some embodiments, Wi-Fi Direct Power Management will allow each SoftAP (Group Owner) to provide Opportunistic Power Save (OPS) and Notice of Absence (NoA) Protocols, thereby covering periods of power savings when all the clients are sleeping and periods of absence regardless of the clients association state.

Figure 1:
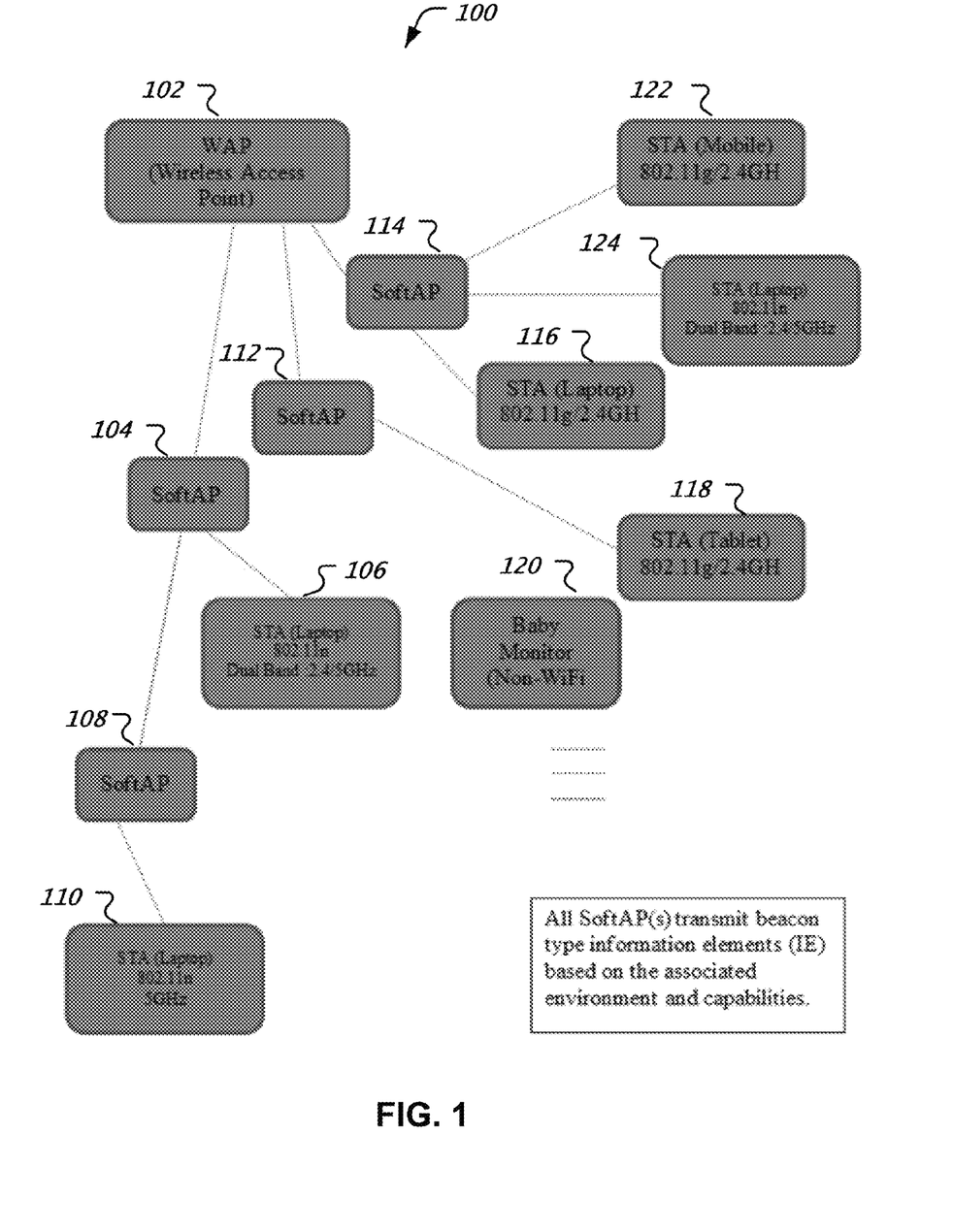
FIG. 1 is an example of a wireless hotspot network.

FIG. 1 shows a wireless system deployment scenario 100. Multiple wireless devices 102, 104, 106, 108, 110, 112, 114, 116, 118, 122 and 124 are wirelessly coupled to one or more other devices and coupled to the Internet via the WAP 102. One non-Wi-Fi device 120 (e.g., a baby monitor) may also operate by using the ISM band.

Wireless devices 104, 108, 112, 114 are marked as "SoftAP" and may implement certain interference controlling operations, as further described below. In some embodiments, SoftAPs may be able to operate in multiple frequency bands. For example, two spectral frequency bands, a 2.4 GHz band and a 5 GHz are available to Wi-Fi devices. Each frequency band may include multiple RF channels on which a wireless network can be established. The SoftAPs 104, 108, 112, 114 may perform some (limited) communications functions (e.g., in accordance with the Wi-Fi Direct standard) generally performed by access points (AP) as defined in the 802.11 standards suite.

SoftAP 104, 108 can be used to extend range of the WAP 102 to provide connectivity to the station (STA) 110. In other words, the WAP transmitter may not have to transmit power at as high a level to directly reach the STA 110 but rather operate at a lower power level to reach the SoftAP 104 that relays communication between WAP 102 and STA 110 via SoftAP 108. In some embodiments, the SoftAP functionality may be implemented in a software-only implementation. In some embodiments, Wi-Fi Direct functionality may be implemented, which allows a station to be in an AP mode, but allows devices to be connected to hard AP through a SoftAP. By contrast, in system 100, the SoftAP 108 is connected to another SoftAP 104. For example, a laptop may be provided or activated to act in the SoftAP mode, typically dual band operation (e.g., 2.4 GHz and 5 GHz operation). However, without the use of interference control rules disclosed herein, throughput may go down in a mixed environment when any device is allowed to join (e.g., by pulling network to 802.11g, or lower throughput). To mitigate this degradation, in some embodiments, all 802.11g devices may be directed to operate on 2.4 GHz and all 802.11n devices may be directed to operate on 5 GHz frequency band.

In some embodiments, further described below, dual mode user devices (e.g., user devices that can simultaneously operate in two different frequency bands and are able to transfer data between the two air interfaces) can be provided with SoftAP functionality by downloading a software module. In some embodiments, the software module may be downloaded only when the target device reports that it is not in possession of a previously downloaded software module. In some embodiments, when it is detected that the software module is already in possession of the target device, a control message may be sent to activate the software module that allows the target device to operate in SoftAP mode. In a typical scenario, proximity and channel selection criteria may be used to make a decision about which client device can be activated. For example, in some embodiments, a wireless device that is farther away may have a higher probability of activation as a SoftAP compared to a near device. One reason may be that the reduction in transmitted power may be more significant when the device that is farther away is able to act as an access point for nearby STAs.

Figure 2:
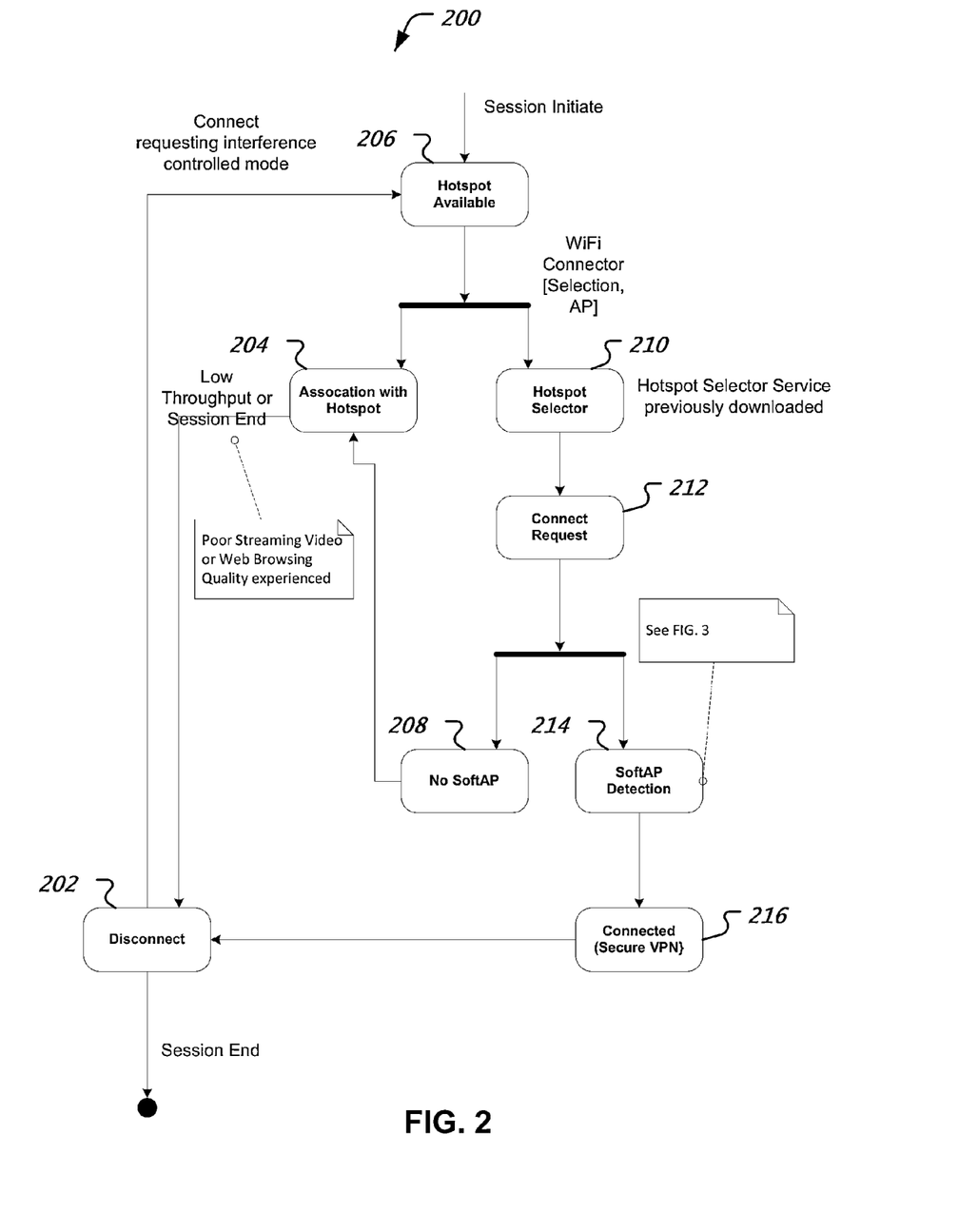
FIG. 2 is an example of a process for operating a wireless hotspot by controlling radio frequency (RF) interference.

Referring to FIG. 2, a wireless user device operating at a location and wishing to establish an Internet connection may first detect that a hotspot is available (206). For example, in many public locations, service operators such as AT&T Wireless provide a wireless access point that also functions as a router and provides internet connectivity over a backhaul network connected to the WAP. Upon establishing this initial connection after associating with the hotspot (204), and during the use, the wireless user device may monitor bandwidth and quality of connection (e.g., latency, bandwidth etc.). When the device notices that the quality of connection has fallen below its expectation (e.g., jittery video, high bit error rate, unsatisfactory web experience etc.) the device may disconnect from the hotspot (202). The wireless device may then re-attempt to connect to a wireless service that is a "special" service (e.g., interference controlled service) instead of a hard router.

When the wireless device attempts to re-join the hotspot in the interference controlled mode, the wireless device may communicate with a hotspot selector 210, sending a connection request 212 to operate under control of the hotspot selector 210 which may also perform interference control operation. The hotspot selector 210 may exchange messages with the wireless device to detect whether the device is able to act as a SoftAP. This may be based on broadcast capability information or directly exchange messages with the device. When it is determined that the wireless device cannot operate in SoftAP mode (208), the wireless device is instructed to associate with the hotspot (204).

When it is determined that SoftAP operation is possible with the wireless device (214), the requesting wireless device is connected to the hotspot selector 210 via a secure virtual private network to exchange messages (216). These messages include, e.g., interference control messages, spectral use reports, transmit power feedback and so on. When the user device decides to end the internet connectivity session, the secure VPN is terminated and the wireless device is disconnected from wireless service (202).

Figure 3:
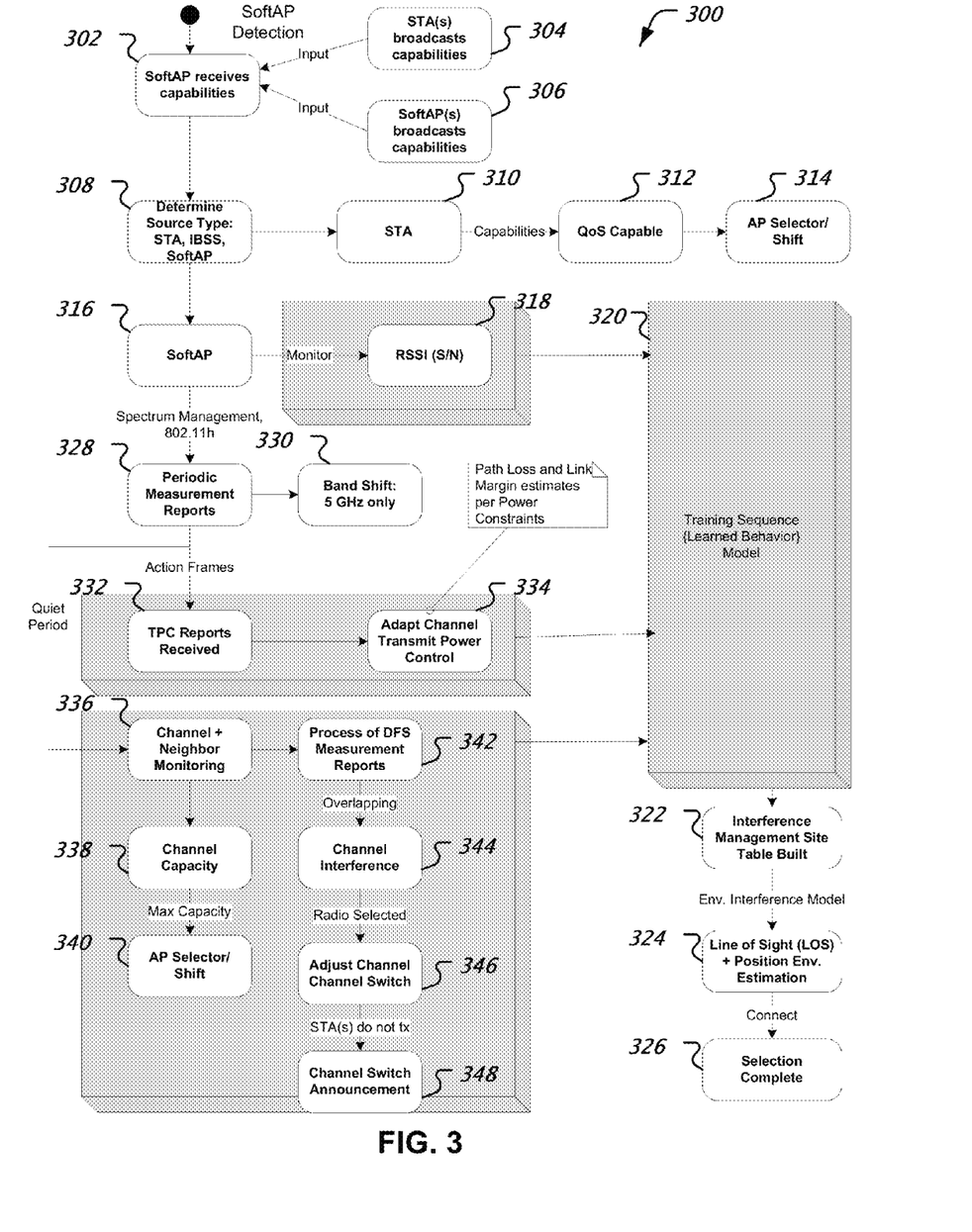
FIG. 3 is an example of the operation of a wireless device in a controlled interference mode.

FIG. 3 represents a flowchart for a SoftAP detection and operation process 300.

SoftAP operation may include spectrum management. In some embodiments, 802.11h may be followed to perform spectrum management. Examples of techniques for spectrum management include dynamic channel management and power control.

To exchange information about device capabilities and spectrum management, 802.11h beacon fields may be used. Alternatively, IP packets (e.g., application layer access established, followed by improvement) may be used. In some embodiments, each SoftAP will be responsible for broadcasting information regarding its identity, capabilities, and environment surroundings. If the beacons and management frames do not include this information, then an IP broadcast or multicast group addressing will include these information elements (IE) in the payload.

At 302, the SoftAP receives capabilities of other devices in the network. For example, other STAs may broadcast their operational capabilities (304). Also, other SoftAPs, if any, may broadcast their capabilities (306). Based on the received device capabilities at the location and based on any additional site table (e.g., other wireless devices at the location), a determination is made (308) whether to operate the SoftAP in a STA mode, or the independent basic service set (IBSS) mode or in the Access Point mode. To make this determination, the type of device on which the present SoftAP software module is running is checked. For example, whether or not the device is capable of dual mode operation, whether or not the device is able to operate in a QoS mode, and so on.

When operating in the SoftAP mode (316), received signal strength indication (RSSI) measurements may be monitored (318) and input to a training sequence module that learns the RF characteristics of the system in which the SoftAP is operating.

Further during the SoftAP operation, the device may use spectrum management techniques such as defined in the 802.11h standard. For example, period measurement reports may be requested and received (328). Based on these reports, a determination may be made about whether or not to perform a band shift (330), e.g., operate in 5 GHz mode only.

The periodic measurement reports may be generated based on RF measurements taken during action frames (e.g., management transmission frames) or during quiet periods in which no device is transmitting on the medium. Based on action frame measurements, transmit power control reports may be received (332). These reports may be used to adapt channel transmit power control (334), including, e.g., calculating path loss and link margin estimates for communication channels to other STAs or SoftAPs.

Based on the measurements during quite period, amount of interference on a channel (e.g., caused by a neighboring access point) can be measured (336). A determination can be made about how much channel capacity is being utilized (338). When, e.g., it is determined that a given RF channel is being used near maximum capacity, then either a new WAP is selected for the data traffic and some traffic is off-loaded to the new WAP (which can establish its network on a different RF channel). Alternatively, the frequency of operation may be shifted for devices currently in the network (340).

Furthermore, DFS measurement reports may be processed (342) to determine if channel interference from nearby channels is above an unacceptable threshold (344) and a channel switch may be performed (346) by announcing the channel switch (348), followed by moving to a new operational frequency (channel).

The measurement reports gathered from measurements made using action frames and during quiet period are input to the training sequence module which creates a model that can be used to build a site table that lists locations and channel characteristics between location pairs (322). It may be possible to draw inferences about the RF environment. For example, it may be possible to determine whether two different locations have a line-of-sight (LOS) channel (324) or whether there is an RF barrier between the two locations (e.g., when path loss is 6 dB or greater). The selection may this be performed by preferring an LOS channel for operation of the wireless connection (326).

In some embodiments, a SoftAP policy discovery mechanism is based on numerous parameters, one or more of which may be implemented in a given embodiment, such as detection of b/g/n type STA based on Supported Rates and High Throughput (HT) Capabilities; Channel Interference [Overlapping vs. Non-overlapping]; Channel Switch Inclusion [Channel Switch Announcement] and Dynamic Frequency Selection (DFS); Channel Quality, Capacity and Utilization metrics; RSSI (S/N): Signal power—Noise Floor ratio; High Throughput Capabilities (HT); Specific to 802.11n devices; Transmit Power Control (TPC) Request/Response Reports; Measurement Reports (e.g., Action Frame, 802.11h); Power Constraint (e.g., Advertised as Min/Max capable power in conjunction with regulatory constraints); Neighbor Reports from other STA(s) and SoftAP(s); Path Loss Calculation Estimate (e.g., Transmit power reported vs. actual received power); Quality of Service (QoS) Access Category Type of Service (TOS) per 802.11e/WMM (Video, Voice); and Location and environment approximation (e.g., causing the SoftAP to make a selection away from physical barriers, if any are detected).

In some embodiments, communications with the STA 106 can be made to limit mixed-mode operation and direct traffic to the less overpopulated band, as newer routers support multiple radios.

QoS data (e.g. voice, video) can be directed to the less overpopulated band and possible a different AP if multiple AP(s) are available in the vicinity.

If applicable, STAs can negotiate/exchange optimal preferred settings (channel assignments, non-overlapping channels) to the router.

STAs further away or out of coverage range or transmission range can connect to a radiating wireless SoftAP that acts as a relay device, when previously they would be unable to gain favorable coverage.

Therefore, a legacy WAP deployed in a location serviced by a service operator can become a smart WAP that can mitigate interference by performing channel selection and transmit power control and additional control functionality without an additional upgrade on the backend or hardware infrastructure. In one beneficial aspect, this solution allows enhanced capabilities to be achieved while still being vendor agnostic and saving cost.

In some embodiments, if currently associated SoftAP moves away from the location, a handoff to another SoftAP may be performed for wireless devices that used the currently associated SoftAP for their internet connectivity. For example, this can be accomplished by monitoring a time window and when no broadcast messages are received from a SoftAP, then a handoff is triggered to another SoftAP.

In some embodiments, RF barriers (e.g. walls, insulation, metal, concrete) can be avoided and selection will be prioritized to Line of Sight (LOS) and centered location areas.

In some embodiments, a reduction in number of devices sharing a particular radio band on the AP may be performed to reduce interference.

In some embodiments, measurement reports include Action frames from one SoftAP and/or STA to measure the quality of another, thereby providing neighbor reports.

In some embodiments, signal gain is increased by controlling the environment and noise having less impact.

In some embodiments, minimum and maximum RF power levels conforming to regulatory constraints may be enforced. In some embodiments, local transmit power may be calculated to reduce interference and limit or increase ranging.

In some embodiments, a measurement and a change of link margin and acceptable attenuation may be used to determine an acceptable power level before communications link no longer functions. Typically, a WAP will have reduced power to reach nearby STA(s), as further STA(s) will be communicating with those nearer STA(s) functioning as a SoftAP.

In some embodiments, SoftAP positioning may be estimated based on path-loss model to estimate the relational distance from other STA(s) and the best selection of one SoftAP over another.

In some embodiments, a channel that shows other co-channel RF activity may be avoided. In Wi-Fi, a number of non-overlapping channels are available for operation (2.4 GHz: 1,6,11, channels and 5 GHz: 23 number of channels in the U.S.).

In some embodiments, channel Selection is based on advertised Supported Channels, Measurement, signal strengths, measuring of non-overlapping channels to determine the channel quality.

In some embodiments, a change in the operational channel is supported by all already connected STA(s) (i.e., do not move to a channel that will result in an STA being dropped from the network).

In some embodiments, channel changing may be limited in environments with many SoftAP(s) functioning, because unused channels may not be readily available. However 802.11n devices may change channels more frequently to perform channel bonding to increase throughput of operation.

In some implementations, QoS capable devices may be moved to a single channel or frequency band so that these devices can enjoy high quality video sessions. In some embodiments, a QoS STA is directed using a Channel Notification message to switch channel.

Figure 4:
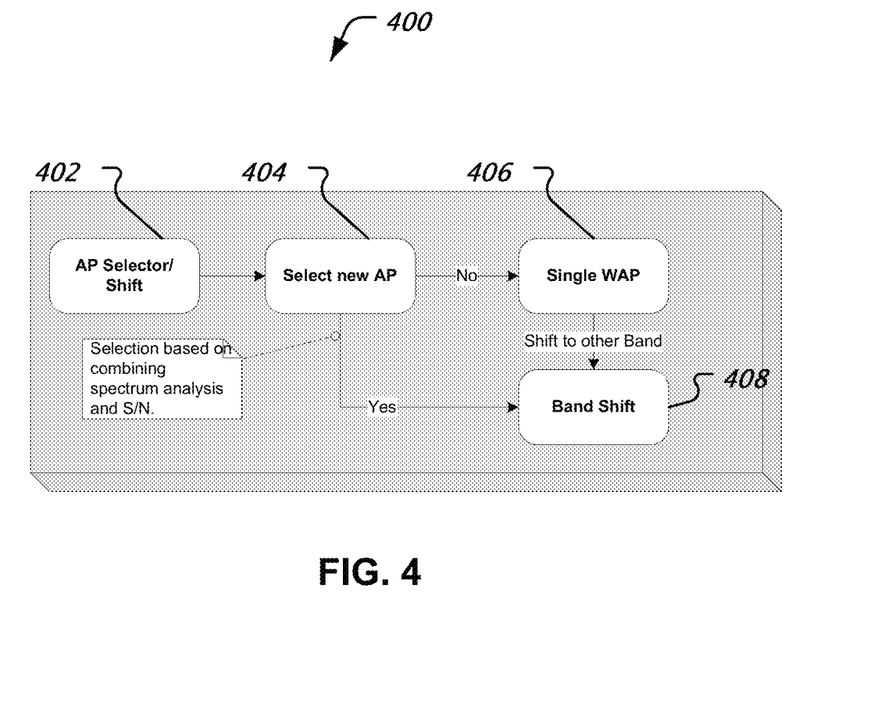
FIG. 4 is an example of an operation flowchart of a wireless communication device.

With reference to FIG. 4, If RF Interference is detected (Wi-Fi and Non-Wi-Fi), a wireless device may be controlled (402) to move to another AP (404) or shift away from the band (408) occupying that same frequency spectrum. The shift to another AP may not be possible if the hotspot operates using a single WAP (406), in which case, the wireless network may be shifted to another frequency band.

Figure 5A:
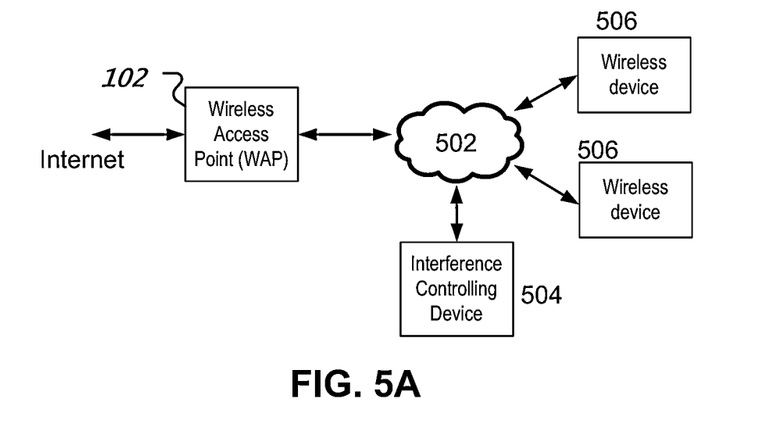
FIGS. 5(a), 5(b) and 5(c) pictorially depict examples of three different deployment scenarios for controlled interference operation of a wireless hotspot.
Figure 5B:
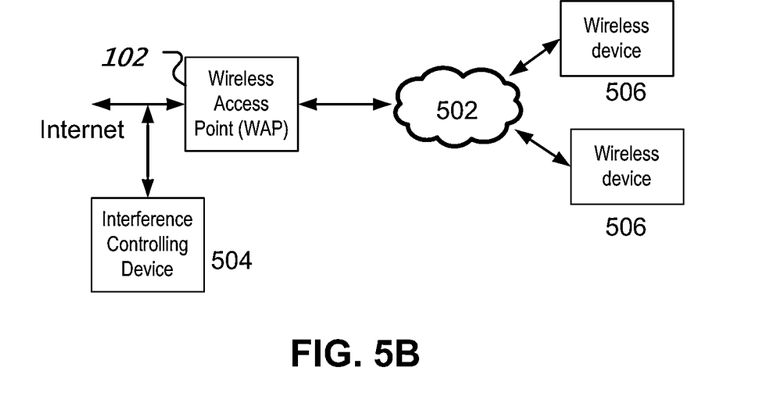
Figure 5C:
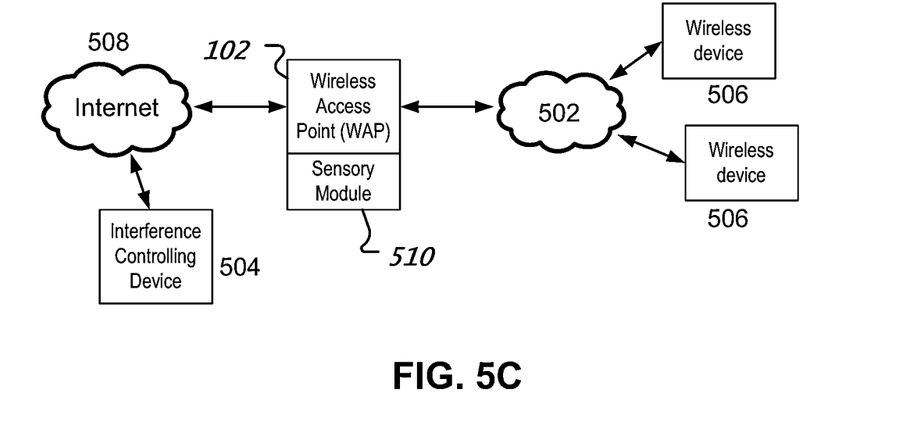

FIGS. 5(a), 5(b) and 5(c) depict three alternate deployment scenarios in which an interference controlled wireless network can be operated.

FIG. 5(a) depicts a deployment example in which a wireless local area network 502 forms a hotspot having WAP 102 as the router that provides internet connectivity to wireless devices 506 coupled to the WLAN 502. The interference controlling device 504 is in communication with the wireless devices 506 using connectivity from the WLAN 502.

Compared to FIG. 5(a), in the deployment depicted in FIG. 5(b), the interference controlling device is located at the location of the WAP 102, but is communicating with the wireless devices 506 via a wired connection to the backhaul Internet connectivity of the WAP 102. In this deployment, the interference controlling device 504 may not have wireless communication capability. In other words, for monitoring RF interference and spectral use in the WLAN 502, the interference controlling device 504 may strictly depend on reports received from wireless devices 506.

In FIG. 5(c), the interference controlling device 504 is coupled to the WLAN 502 over the internet 508, through the WAP 102. In this deployment, the interference controlling device 504 may not be physically present at the location of the hotspot, but may be elsewhere (e.g., at a service provider's facility). The interference controlling device 504 may be in communication with a sensory module 510 that may be a stand-alone module, or a part of the WAP 102. The sensory module 510 may be configured to provide RF characteristics of the hotspot to the interference controlling device 504.

Figure 6:
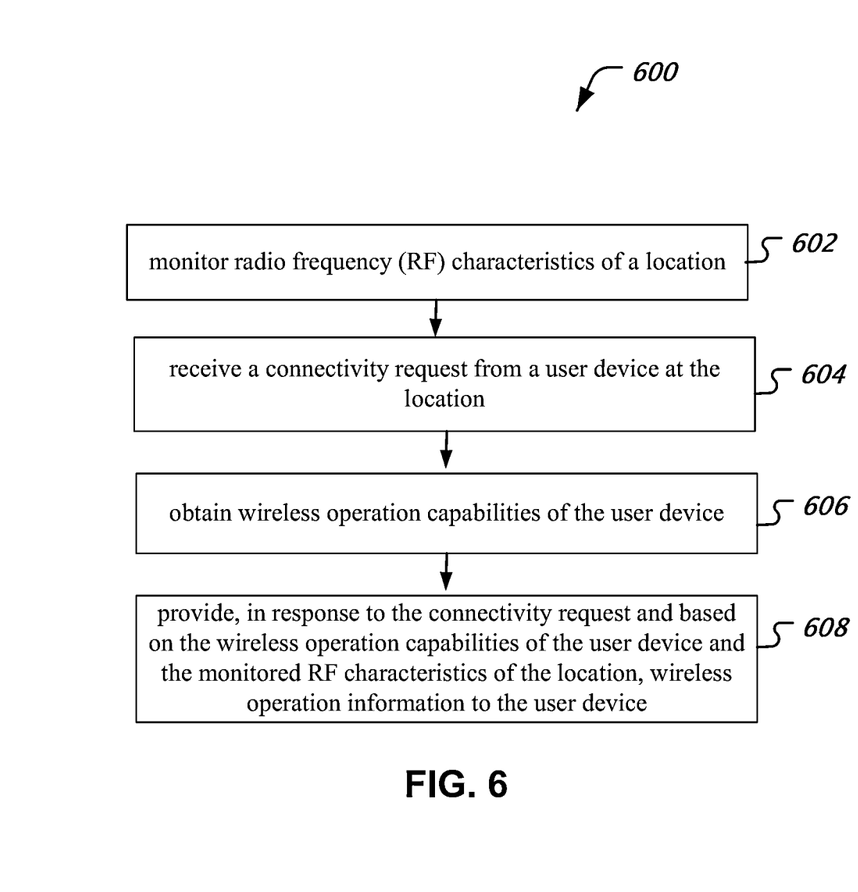
FIG. 6 is an example of a process for providing wireless connectivity to a user device.

FIG. 6 is a flowchart representation of a process 600 of providing wireless connectivity to a user device.

At 602, the process 600 monitors radio frequency (RF) characteristics of a location. In some embodiments, 602 includes monitoring a number of devices operating on each RF transmission channel available at the location and monitoring a type of air interface protocol (e.g., 802.11) used by each wireless device operating at the location.

In some implementations, 602 includes obtaining information indicative of a transmission power level used by the user device and other user devices operating at the location. As previously described, fields used by 802.11h beacon frames may be used for obtaining the information. In some embodiments, physical barriers causing RF signal attenuation at the location may be estimated. For example, a threshold may be used to determine the presence of a physical barrier (e.g., 3 dB or 6 dB additional attenuation in the link that is not due to the distance between the transmitter/receiver pair). In some embodiments, the estimation of the physical barrier is used to control wireless operation rules of another wireless device (e.g., transmit power or which frequency band the device should operate in, and so on).

At 604, the process 600 receives a connectivity request from a user device at the location.

At 606, the process 600 obtains wireless operation capabilities of the user device. In some embodiments, the information obtained may include information about whether or not the user device is capable of a dual-band operation.

At 608, the process 600 provides, in response to the connectivity request and based on the wireless operation capabilities of the user device and the monitored RF characteristics of the location, wireless operation rules to the user device. In some implementations, the providing the wireless operation rules includes determining whether the user device is operable in an access point mode in which the user device performs upstream and downstream data transmissions with another user device and downloading a software module to the user device to provide the access point mode capability to the user device.

In some embodiments, the process 600 further includes receiving an interference report from the user device and updating the monitored RF characteristics of the location based on the received interference report.

In some embodiments, the process 600 includes obtaining a first unique identification for a first wireless access point providing Internet connectivity at the location and a second unique identification for a second wireless access point providing Internet connectivity at the location wherein the wireless operation rules includes the first unique identification or the second unique identification, thereby instructing the wireless device to establish connectivity with the first wireless access point or the second wireless access point. The unique identification could, e.g., be the medium access control (MAC) serial number of the device and may further include the subscriber service set id (SSID) of the wireless access point.

Figure 7:
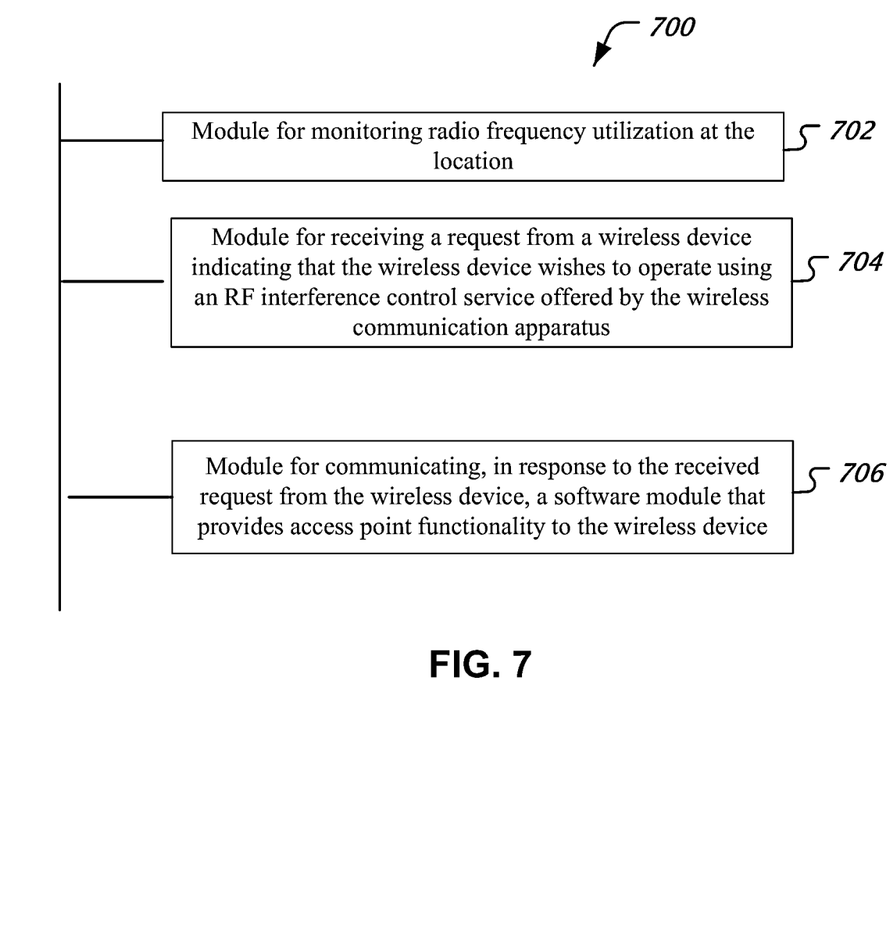
FIG. 7 shows an example of a block diagram of an apparatus for controlling radio frequency (RF) interference among a plurality of wireless devices operating at a location.

FIG. 7 is a block diagram representation of an apparatus 700 for controlling radio frequency (RF) interference among a plurality of wireless devices operating at a location. In some embodiments, the apparatus operates to control RF interference without providing internet connectivity and without providing data traffic routing capability to the plurality of wireless devices.

The module 702 (e.g., interference monitoring module) is for monitoring radio frequency utilization at the location. In some embodiments, the interference monitoring module monitors RF utilization at the location using a radio frequency receiver module that receives wireless signals to monitor spectral usage or a spectrum use receive module that receives reports from the wireless devices, the reports comprising information about spectral interference measured at the wireless devices.

The module 704 (e.g., a device registration module) is for receives a request from a wireless device indicating that the wireless device wishes to operate using an RF interference control service offered by the wireless communication apparatus.

The module 706 (e.g., a download module) is for communicating, in response to the received request from the wireless device, a software module that provides access point functionality to the wireless device.

In some embodiments, the apparatus 700 further includes a channel selection module that assigns, for each registered wireless device, an RF channel for operation for the corresponding registered wireless device. In some embodiments, the channel selection module is further configured to assign the RF channel for operation based on a Quality of Service desired by the registered wireless device and an air interface protocol version capability of the registered wireless device. In some embodiments, the apparatus 700 may be able to tune and operate on different RF channels or frequency bands, but, at any given time, may only be able to operate in a single frequency band and RF channel. In some embodiments, the apparatus 700 may have the ability to simultaneously operate on multiple channels (e.g., channel bonding to increase throughput).

In some embodiments, the apparatus 700 further includes a spectrum use receive module that receives reports from the wireless devices, the reports comprising information about spectral interference measured at the wireless devices, including transmission power used by the wireless devices and a topology determination module that determines, based on the received reports from the wireless devices, an RF obstruction at the location. In some embodiments, a relay configuration module that controls operation of one of the wireless devices to operate in a relay mode to provide wireless connectivity to another one of the wireless devices across the RF obstruction is further included. In some embodiments, the relay configuration module controls operation of one of the wireless devices to operate in a relay mode to provide wireless connectivity to another one of the wireless devices that is outside a transmission range of the access point. The transmission range may be increased such that the relay module is within the transmission range of the wireless access point, and the wireless device is within the transmission range of the relay device, but the wireless device is outside of the transmission range of the wireless access point.

Figure 8:
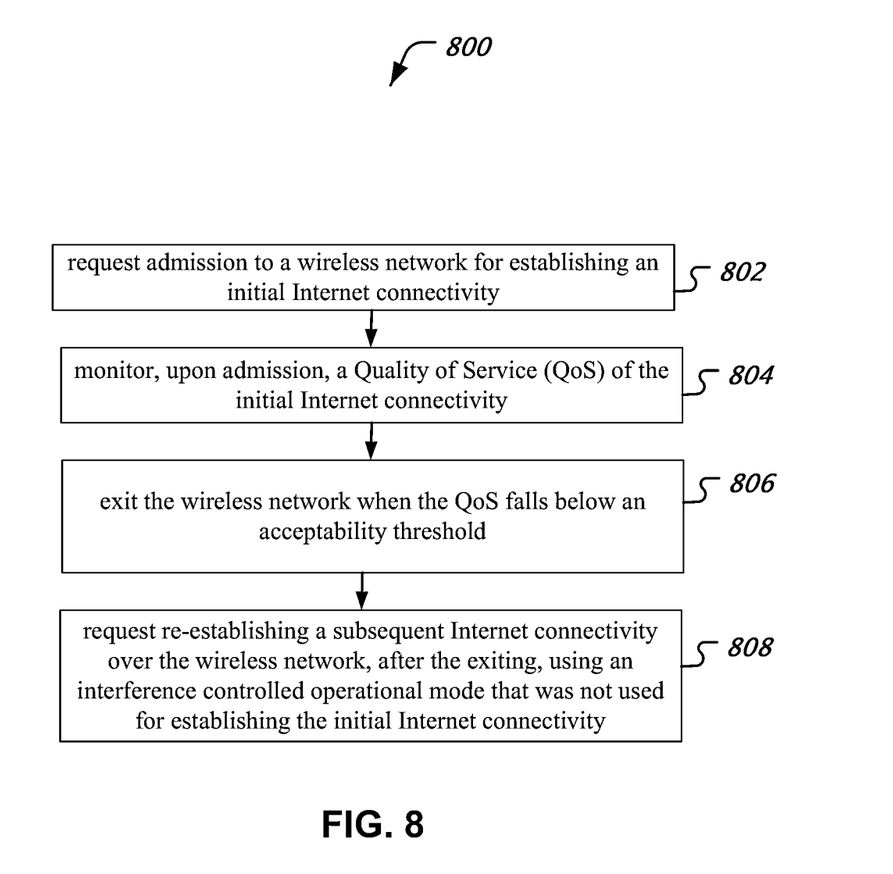
FIG. 8 is an example of a process for wireless communications.

FIG. 8 depicts a flowchart of a process 800 of wireless communication. The process 800 may be implemented on a wireless device that is a user equipment such as a smartphone or a tablet computer.

At 802, the process 800 requests admission to a wireless network for establishing an initial Internet connectivity.

At 804, the process 800 monitors, upon admission, a Quality of Service (QoS) of the initial Internet connectivity;

At 806, the process 800 exits the wireless network when the QoS falls below an acceptability threshold; and At 808, the process 800 requests re-establishing a subsequent Internet connectivity over the wireless network, after the exiting, using an interference controlled operational mode that was not used for establishing the initial Internet connectivity.

In some embodiments, the process 800 further includes receiving a software module and executing the software module to implement the interference controlled operational mode when transmitting and receiving data in the wireless network.

In some embodiments, the process 800 further includes transmitting information indicative of an amount of radio frequency interference estimated on a wireless channel of operation.

It will be appreciated that techniques are provided for providing wireless connectivity without having to upgrade backend infrastructure. In some embodiments, the presence of a physical barrier may be indicative of a steep increase in RF power level for maintaining connectivity between two wireless devices. In some implementations, non-Wi-Fi interference may be mitigated by channel selection or SoftAP reassignment. In some embodiments, the wireless connectivity to an access point may be provided through multiple hops (relays).

It will further be appreciated that the disclosed techniques enable the establishment of a wireless local area network in which some wireless devices are configured to act as access points and learning RF characteristics at a site (e.g., via a site table) to assign a frequency band of operation to other wireless devices in the network.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An apparatus for controlling Wi-Fi radio frequency (RF) interference among a plurality of wireless devices operating at a location, comprising:
   an interference monitoring module that monitors Wi-Fi radio frequency utilization at the location;
   a device registration module that receives a request from a wireless device indicating that the wireless device wishes to operate using a Wi-Fi RF interference control service offered by the wireless communication apparatus; and
   a download module that communicates, in response to the received request from the wireless device, a software module that provides Wi-Fi access point functionality to the wireless device and a message providing the access point functionality of the wireless device, when the wireless device possesses the access point functionality, wherein the apparatus operates to control RF interference without providing internet connectivity and without providing data traffic routing capability to the plurality of wireless devices.

2. The apparatus of claim 1, wherein the interference monitoring module monitors Wi-Fi RF utilization at the location based on detection of wireless signals to monitor spectral usage or receipt of reports from the wireless devices that include information about spectral interference measured at the wireless devices.

3. The apparatus of claim 1, further comprising:
   a channel selection module that assigns, for each registered wireless device, an RF channel for operation for the corresponding registered wireless device.

4. The apparatus of claim 3, wherein the channel selection module is further configured to assign the RF channel for operation based on a Quality of Service desired by the registered wireless device and an air interface protocol version capability of the registered wireless device.

5. An apparatus for controlling Wi-Fi radio frequency (RF) interference among a plurality of wireless devices operating at a location, comprising:
   an interference monitoring module that monitors Wi-Fi radio frequency utilization at the location;
   a device registration module that receives a request from a wireless device indicating that the wireless device wishes to operate using a Wi-Fi RF interference control service offered by the wireless communication apparatus;
   a download module that communicates, in response to the received request from the wireless device, a software module that provides Wi-Fi access point functionality to the wireless device and a message providing the access point functionality of the wireless device, when the wireless device possesses the access point functionality;
   a spectrum use receive module that receives reports from the wireless devices, the reports comprising information about spectral interference measured at the wireless devices, including transmission power used by the wireless devices; and
   a topology determination module that determines, based on the received reports from the wireless devices, an RF obstruction at the location.

6. The apparatus of claim 5, further comprising:
   a relay configuration module that controls operation of one of the wireless devices to operate in a relay mode to provide wireless connectivity to another one of the wireless devices across the RF obstruction.

7. The apparatus of claim 5, further comprising:
   a relay configuration module that controls operation of one of the wireless devices to operate in a relay mode to provide wireless connectivity to another one of the wireless devices that is outside a transmission range of the access point.

8. A non-transitory computer program product comprising a non-transitory computer-readable medium having code stored thereon, the code, when executed, causing a processor to implement a method of Wi-Fi wireless communication, the method comprising:
   requesting admission to a wireless network for establishing an initial Wi-Fi Internet connectivity;
   monitoring, upon admission, a Quality of Service (QoS) of the initial Wi-Fi Internet connectivity;
   exiting the wireless network when the QoS falls below an acceptability threshold; and
   requesting re-establishing a subsequent Wi-Fi Internet connectivity over the wireless network, after the exiting, using an interference controlled operational mode that was not used for establishing the initial Internet connectivity.

9. The computer program product of claim 8, wherein the method further comprises:
  receiving a software module; and
  executing the software module to implement the interference controlled operational mode when transmitting and receiving data in the wireless network.

10. The computer program product of claim 9, wherein the method further comprises:
  transmitting information indicative of an amount of radio frequency interference estimated on a wireless channel of operation.

\* \* \* \* \*